US006617715B1

(12) United States Patent
Harris et al.

(10) Patent No.: US 6,617,715 B1
(45) Date of Patent: Sep. 9, 2003

(54) LIQUID COOLED ALTERNATOR HAVING FINNED STATOR SLEEVE

(75) Inventors: Richard K. Harris, Pinckney, MI (US); David W. Linden, Ann Arbor, MI (US); Steven J. Yockey, Ypsilanti, MI (US); Kevin R. Harpenau, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/305,733

(22) Filed: Nov. 27, 2002

(51) Int. Cl.[7] .............................. H02K 9/00; F01P 3/12
(52) U.S. Cl. ........................... 310/54; 310/58; 310/64; 123/41.31
(58) Field of Search ............................. 310/54, 58, 59, 310/60 R, 60 A, 64; 123/41.31, 142.5 R; 237/12.3 R; 126/247

(56) References Cited

U.S. PATENT DOCUMENTS

| | | | |
|---|---|---|---|
| 1,803,570 A | 5/1931 | Uggla | |
| 2,735,950 A | 2/1956 | Brown | |
| 2,828,515 A | 4/1958 | Dolenc | |
| 4,085,343 A | 4/1978 | Hasegawa et al. | |
| 4,465,946 A | 8/1984 | Springer | |
| 4,739,204 A | * 4/1988 | Kitamura et al. | ......... 310/68 D |
| 4,839,547 A | 6/1989 | Lordo et al. | |
| 4,980,588 A | * 12/1990 | Ogawa | ...................... 310/68 D |
| 5,019,737 A | 5/1991 | Bruno | |
| 5,220,233 A | 6/1993 | Birch et al. | |
| 5,293,089 A | * 3/1994 | Frister | .......................... 310/54 |
| 5,331,238 A | 7/1994 | Johnsen | |
| 5,491,371 A | 2/1996 | Ooi | |
| 5,836,270 A | * 11/1998 | Aoki et al. | .............. 123/41.31 |
| 5,982,071 A | 11/1999 | Ehrick | |
| 6,160,332 A | * 12/2000 | Tsuruhara | .................... 310/54 |
| 6,169,344 B1 | * 1/2001 | Tsuruhara | .................... 310/58 |
| 6,300,693 B1 | 10/2001 | Poag et al. | |

\* cited by examiner

*Primary Examiner*—Tran Nguyen
(74) *Attorney, Agent, or Firm*—Brinks Hofer Gilson & Lione

(57) ABSTRACT

An automotive alternator includes an inner housing assembly, an outer housing assembly mounted over the inner housing assembly, and an internal plate mounted within the outer housing assembly. The inner housing assembly, the outer housing assembly, and the internal plate define a sealed flow chamber. The flow chamber includes an inlet reservoir and an outlet reservoir located adjacent a first end, and a cross over reservoir located adjacent a second end. The inner housing assembly includes a plurality of radially extending axial fins. The fins extend outward from the sleeve toward the outer housing to define a plurality of axial flow channels. A first portion of the flow channels interconnects the inlet reservoir to the cross over reservoir and a second portion of the flow channels interconnects the cross over reservoir to the outlet reservoir.

15 Claims, 5 Drawing Sheets

LIQUID COOLED ALTERNATOR HAVING FINNED STATOR SLEEVE

FIELD OF INVENTION

The invention relates to an automotive electrical machine, and particularly to an alternator having a finned stator sleeve adapted to channel liquid coolant axially through the alternator to cool the alternator.

BACKGROUND OF THE INVENTION

This invention is related to an electrical alternator, particularly adapted for use in motor vehicle applications including passenger cars and light trucks. These devices are typically mechanically driven using a drive belt wrapped on a pulley connected to the crankshaft of the vehicle's internal combustion engine. The belt drives a pulley on the alternator which rotates an internal rotor assembly to generate alternating current (AC) electrical power. This alternating current electrical power is rectified to direct current (DC) and supplied to the motor vehicle's electrical bus and storage battery.

While alternators have been in use in motor vehicles for many decades, today's demands on motor vehicle design, cost, and performance have placed increasing emphasis on the design of more efficient alternators. Today's motor vehicles feature a dramatic increase in the number of electrical on-board systems and accessories. Such electrical devices include interior and exterior lighting, climate control systems; increasingly sophisticated powertrain control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the vehicle's electrical system demands vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its' mass which relates to the vehicle's fuel mileage.

In addition to the need of providing higher electrical output, designers of these devices further strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

One concern with higher power producing alternators is heat production. Fans mounted on the rotor or pulley of the alternator will circulate air to cool the alternator, however, with higher output alternators, there is too much heat produced to be dissipated by these fans. Liquid cooled alternators dissipate the heat more effectively, but require extra size to accommodate cooling flow channels. Liquid cooled alternators further offer the benefit of running quieter than air cooled alternators, a desired feature as designers seek to reduce overall vehicle noise.

Therefore, there is a need for an alternator having improved conductive cooling features that allow liquid coolant to flow through the alternator while still maintaining a small compact size.

SUMMARY OF THE INVENTION

In a first aspect of the present invention, an alternator includes an inner housing assembly, an outer housing mounted over the inner housing assembly. O-rings positioned between the inner housing assembly and the outer housing define a sealed liquid coolant flow chamber having an inlet reservoir, an outlet reservoir, and a cross over reservoir. The inner housing assembly includes a stator sleeve having a plurality of radially extending axial fins which extend outward to contact the inner surface of the outer housing to define a plurality of axial flow channels. A first portion of the flow channels interconnects the inlet reservoir to the cross over reservoir, and a second portion of the flow channels interconnects the cross over reservoir to the outlet reservoir.

The inlet and outlet reservoirs are defined by opposing first and second disk shaped portions of the inner housing spaced apart from one another to form a disk shaped cavity extending diametrically across the alternator. A divider extend across and divides the disk shaped cavity into the inlet reservoir and the outlet reservoir.

An inlet extends from the inlet reservoir and is adapted to allow liquid coolant to enter the inlet reservoir. An outlet extends from the outlet reservoir and is adapted to allow coolant to exit the flow chamber. Coolant entering the flow chamber flows from the inlet reservoir axially through the flow channels to the cross over reservoir. From the cross over reservoir the coolant then flows axially through the flow channels to the outlet reservoir.

In another aspect of the present invention, the inlet and the outlet are adapted to connect to a coolant system of an automobile such that engine coolant is circulated through the electric machine.

In still another aspect of the present invention, the alternator comprises a shaft rotatably supported within the inner housing assembly by a pair of bearing elements, having a pulley mounted to a first end and a pair of slip rings mounted to a second end. A rotor assembly, including first and second pole pieces, is mounted onto the shaft with an excitation winding mounted between the first and second pole pieces and a stator assembly is fixedly mounted within the inner housing in functional engagement with the rotor assembly.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

Figure 1:
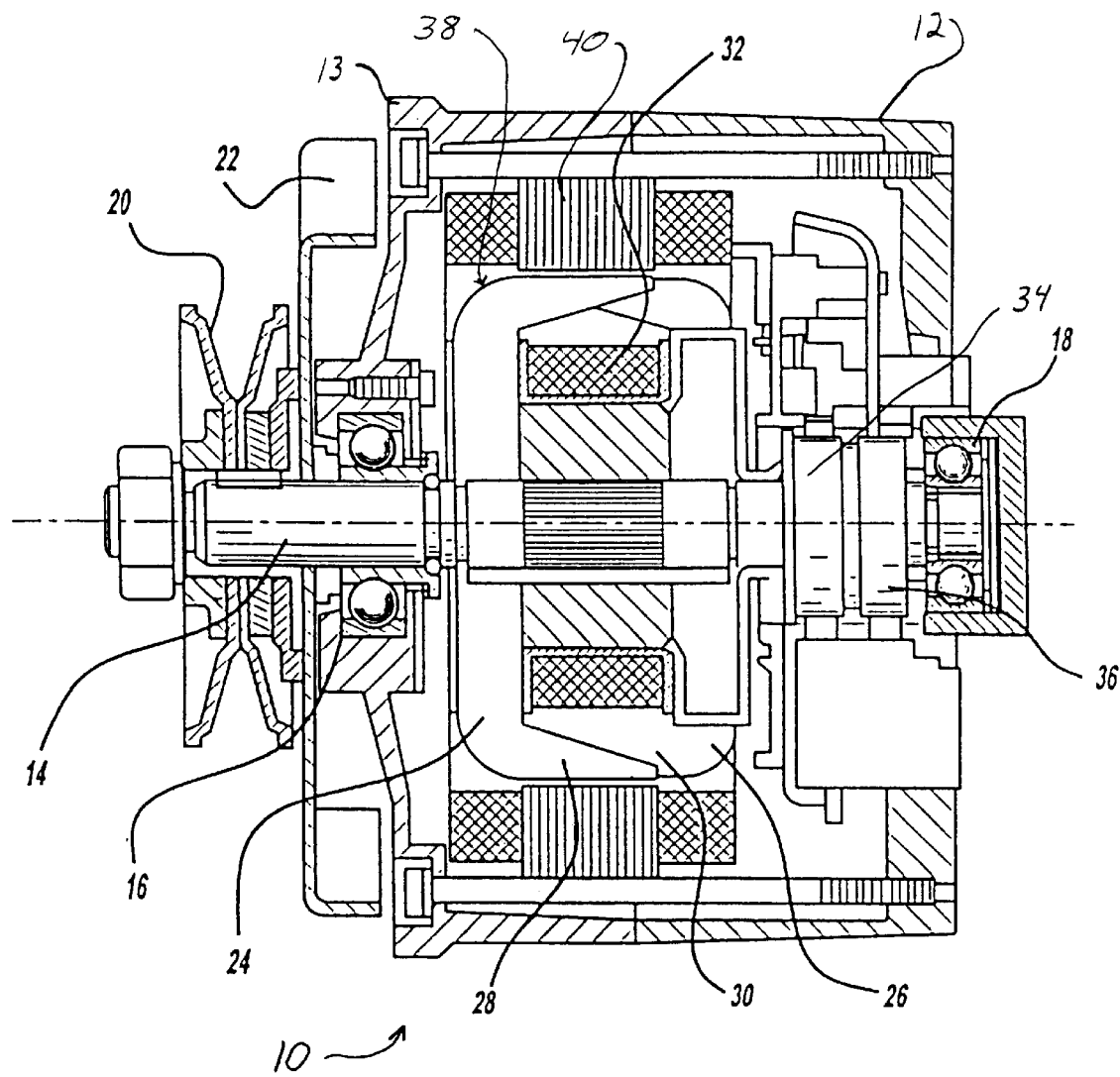
FIG. 1 is a cross sectional view of a typical prior art electrical alternator.

In order to provide a framework for a further detailed description of the preferred embodiments of this invention, FIG. 1 is presented illustrating a prior art electrical alternator configuration. That figure illustrates an electrical alternator 10 enclosed within a housing 12, 13. An alternator rotor shaft 14 is supported by rolling element bearings 16 and 18. A belt driven pulley 20 is fastened to the protruding front end of rotor shaft 14. A fan 22 rotates with shaft 14 and provides cooling airflow for removing heat from alternator 10. Front and rear alternator poles 24 and 26, respectively, rotate with the shaft 14 and have extending claw fingers 28 and 30, respectively. Fingers 28 and 30 interlace to create the well known "claw pole" rotor configuration. Excitation winding 32 is carried within the cavity formed between poles 24 and 26. A DC excitation signal is applied to excitation winding 32 through a pair of slip rings 34 and 36, and associated brushes.

A rotor assembly 38 which includes pole pieces 24 and 26, winding 32, and slip rings 34 and 36, produces an alternating polarity magnetic field which rotates with rotation of the rotor assembly 38. Although a DC excitation signal is applied to the slip rings 34 and 36, the interlacing of alternating poles 24 and 26 creates an alternating polarity magnetic field as presented to the windings of a stationary stator core 40 located radially around the rotor assembly 38. The movement of the alternating polarity magnetic field presented by rotor assembly 38 across the windings of the core 40 generates electricity in a well-known manner.

Electrical energy output by electrical alternator 10 generated within the core 40 is directed to rectifying diodes (not shown) and perhaps further filtering and power conditioning devices before being connected with the vehicle's electric distribution bus. Sophisticated control systems, also known as voltage regulators, are used to apply an appropriate level of DC voltage to the excitation windings 32 to generate the desired RMS value of the outputted alternating current from the alternator 10, which can be in single phase or multi-phase form, depending on the winding design of the core 40.

Figure 2:
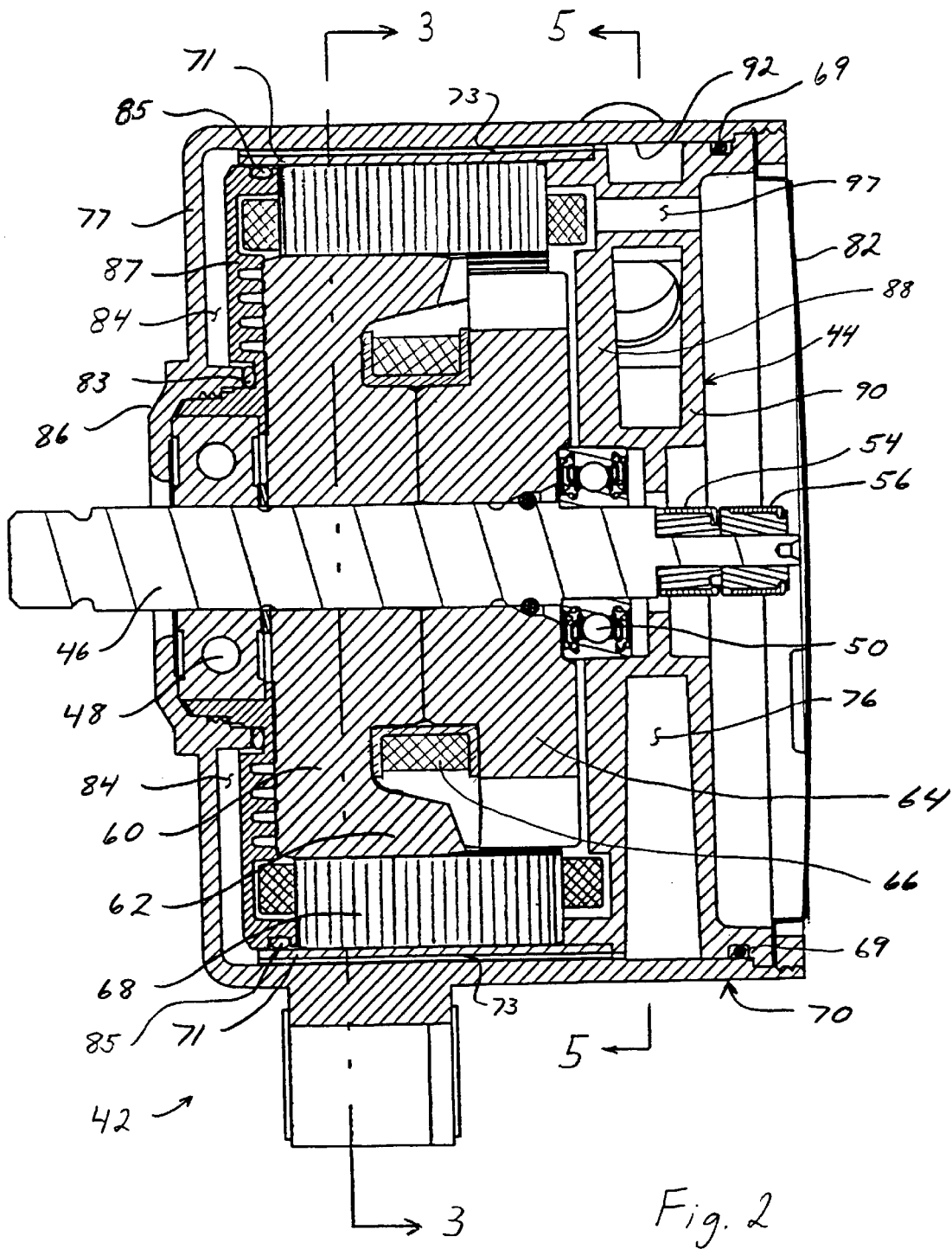
FIG. 2 is a cross sectional view of an alternator of the present invention.

Referring to FIG. 2, an alternator of the present invention is shown generally at 42. The alternator 42 includes an inner housing assembly 44 which is adapted to support internal components of the alternator 42. A rotor shaft 46 is rotatably supported within the inner housing assembly 44 by a pair of bearing elements 48 and 50. A pulley (not shown) can be mounted the shaft 46 to engage a drive belt (not shown) to provide rotating drive to the shaft 46 of the alternator 42. A pair of slip rings 54 and 56 are mounted to a second end of the shaft 46 and are adapted to engage brushes (not shown) within the alternator 42.

A rotor assembly 60 is mounted within the inner housing assembly 44. The rotor assembly 60 includes first and second pole pieces 62 and 64 mounted onto the shaft 46. An excitation winding 66 is mounted between the first and second pole pieces 62 and 64. A stator assembly 68 is fixedly mounted within the inner housing assembly 44 in functional engagement with the rotor assembly 60.

Figure 3:
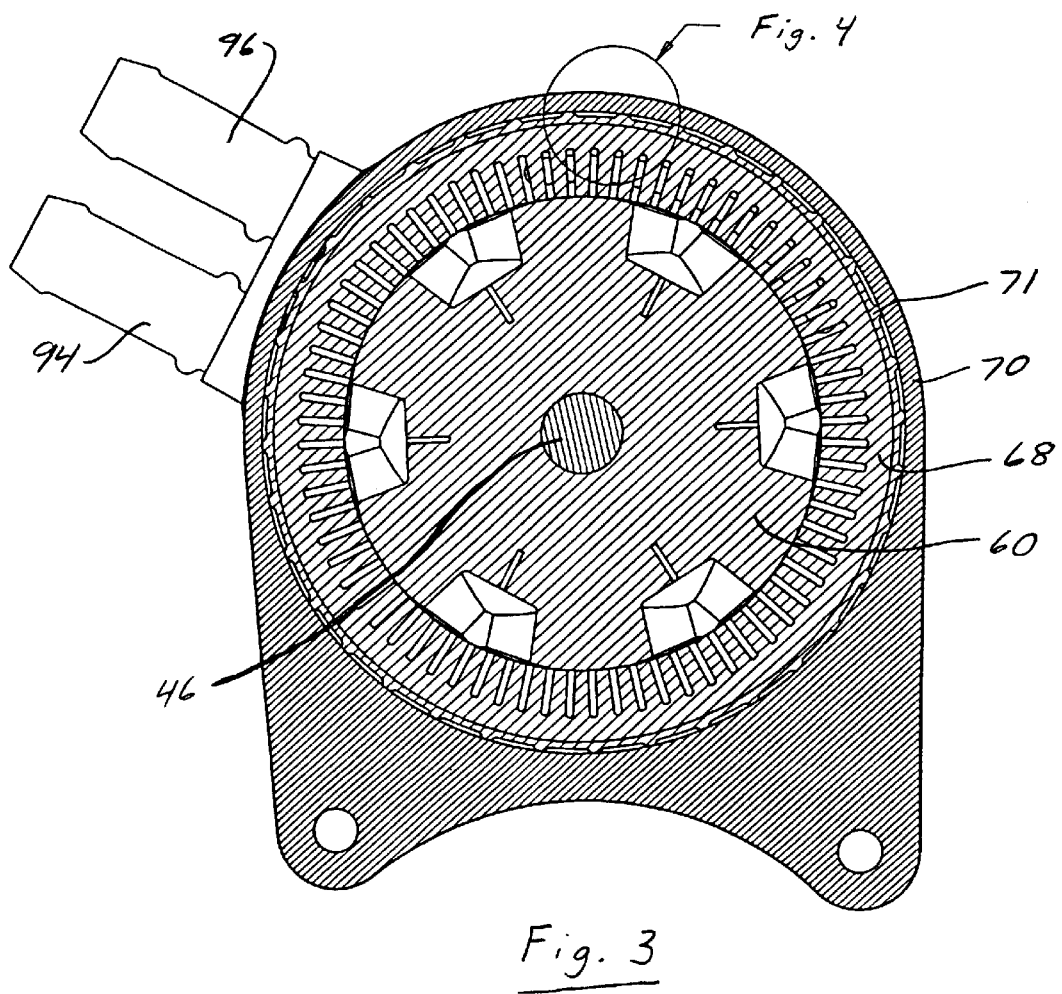
FIG. 3 is a sectional view taken along line 3—3 of FIG. 2.
Figure 4:
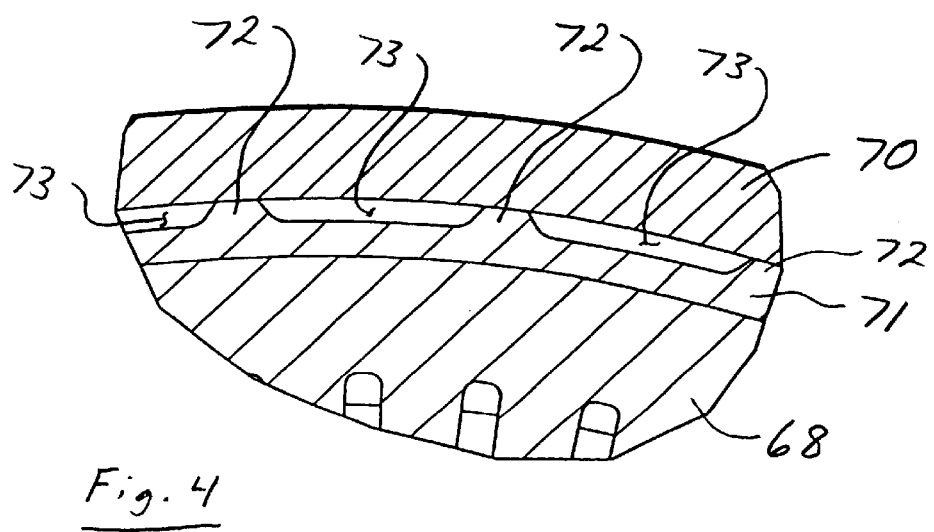
FIG. 4 is an enlarged portion of FIG. 3.

An outer housing assembly 70 is mounted over the inner housing assembly 44 to create a flow chamber 76 therebetween. A first o-ring 69 is positioned between the inner housing assembly 44 and the outer housing assembly 70 to seal the flow chamber 76. Referring to FIGS. 3 and 4, the inner housing assembly 44 includes a plurality of radially extending axial fins 72. Preferably, the inner housing assembly 44 includes a sleeve 71, and the plurality of radially extending axial fins 72 extends therefrom, however, the fins could also be intregally formed with and extend directly from the inner housing assembly 44, thereby reducing part count and manufacturing cost. The fins 72 extend radially outward from the sleeve 71. Preferably, the fins 72 extend outward and contact the inner surface of the outer housing 70, however, the fins 72 can extend to a point in close proximity to the inner surface of the outer housing as well. The fins 72 define a plurality of axial flow channels 73. The sleeve 71 is preferably press fit onto the inner housing 44 and sealed with an anaerobic sealant, to keep the flow chamber 76 sealed.

Figure 5:
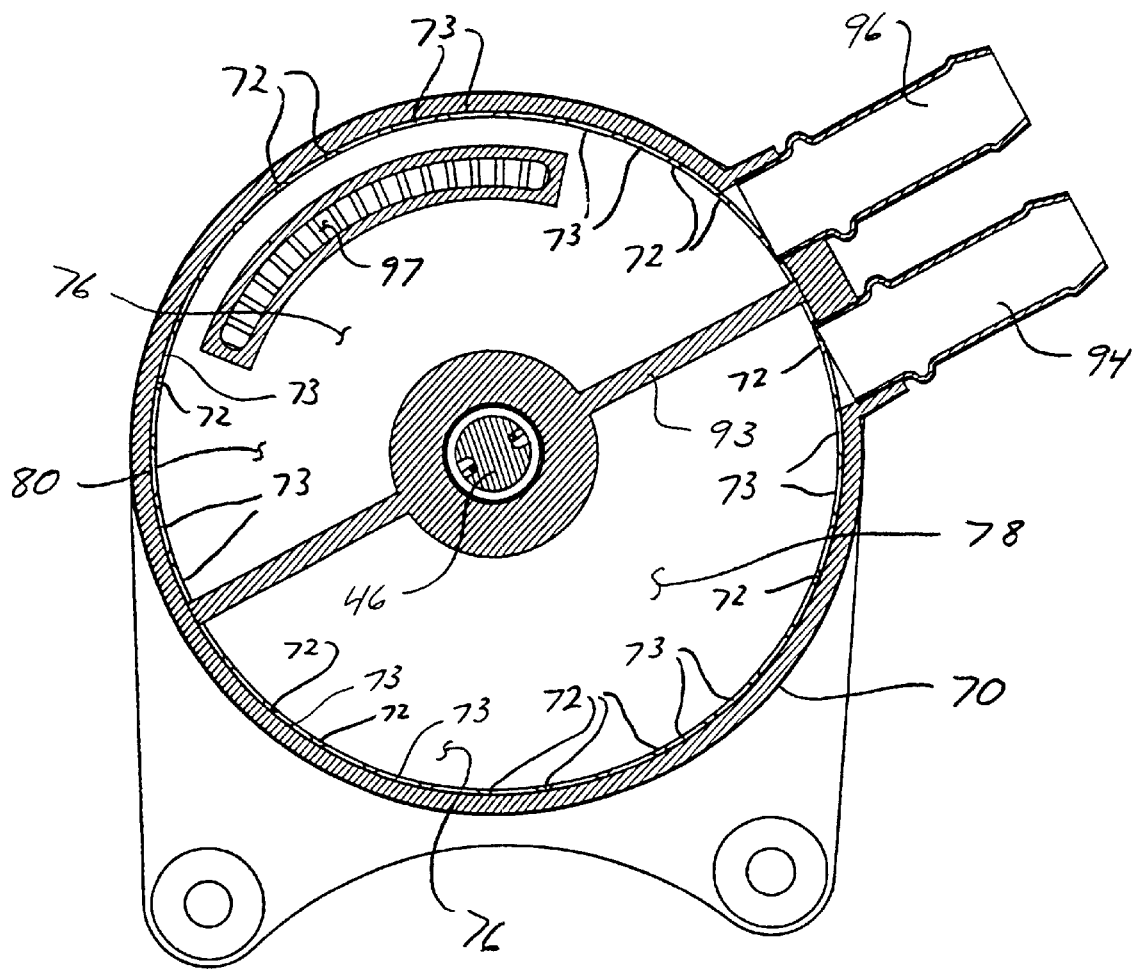
FIG. 5 is a sectional view taken along line 5—5 of FIG. 2.

Referring to FIG. 5, the flow chamber 76 includes an inlet reservoir 78, and an outlet reservoir 80 located adjacent a first end 82 of the alternator 42. The flow chamber 76 further includes a cross over reservoir 84 located adjacent a second end 86 of the alternator 42. The outer housing assembly 70 includes an outer housing 77 and an internal plate 87. The cross over reservoir 84 is a disk shaped cavity that is defined by the internal plate 87. The internal plate 87 is mounted to the inside of the outer housing 70 adjacent the second end 86. An o-ring 83 provides a seal between the outer housing 77 and the internal plate 87 to keep the flow chamber 76 sealed. The internal plate 87 is a disk shaped member positioned at a distance from the second end 86 such that the inner surface of the outer housing 77 and the internal plate 87 define the cross over reservoir 84. Another o-ring 85 is positioned between the inner housing assembly 44 and the outer housing assembly 70 near the second end 86 of the alternator 42 to seal the flow chamber 76.

The inlet reservoir 78 and the outlet reservoir 80 are defined by a first disk shaped portion 88 of the inner housing assembly 44 positioned at a distance from a second disk shaped portion 90 of the inner housing assembly 44, and an inner diameter 92 of the outer housing 77. The first disk shaped portion 88, the second disk shaped portion 90, and the inner diameter 92 of the outer housing 77 define a disk shaped cavity. A divider 93 extends diametrically across the disk shaped cavity, thereby dividing the disk shaped cavity into the inlet reservoir 78 and the outlet reservoir 80.

Referring to FIGS. 2 and 5, a passageway 97 extends across either the inlet reservoir 78 or the outlet reservoir 80 to allow lead wires from the winding of the stator assembly 68 to extend from the stator assembly 68 to the first end 82 of the alternator 42 to connect to rectifying diodes (not shown).

A first portion of the plurality of axial flow channels 73 interconnects the inlet reservoir 78 to the cross over reservoir 84 and a second portion of the plurality of axial flow channels 73 interconnects the cross over reservoir 84 to the outlet reservoir 80.

An inlet 94 extends from the inlet reservoir 78 and is adapted to connect to a source of coolant and allow coolant to enter the inlet reservoir 78. An outlet 96 extends from the outlet reservoir 80 and is adapted to allow coolant to exit the outlet reservoir 80. Coolant entering the inlet reservoir 78 must flow axially through the first portion of axial flow channels 73, toward the second end 86, to the cross over reservoir 84. The coolant then changes direction to flow diametrically across the cross over reservoir 84. The coolant then changes direction again to flow axially through the second portion of flow channels 73, toward the first end 82, and into the outlet reservoir 80.

Preferably, the inlet 94 and the outlet 96 are adapted to connect to the coolant system of an automobile engine. The design of the present invention allows the alternator 42 to be compact enough to be placed upstream of a heater core so that the heat absorbed by the coolant flowing through the alternator 42 is then used in the heater core to provide warm air to the interior of the vehicle.

Figure 6:
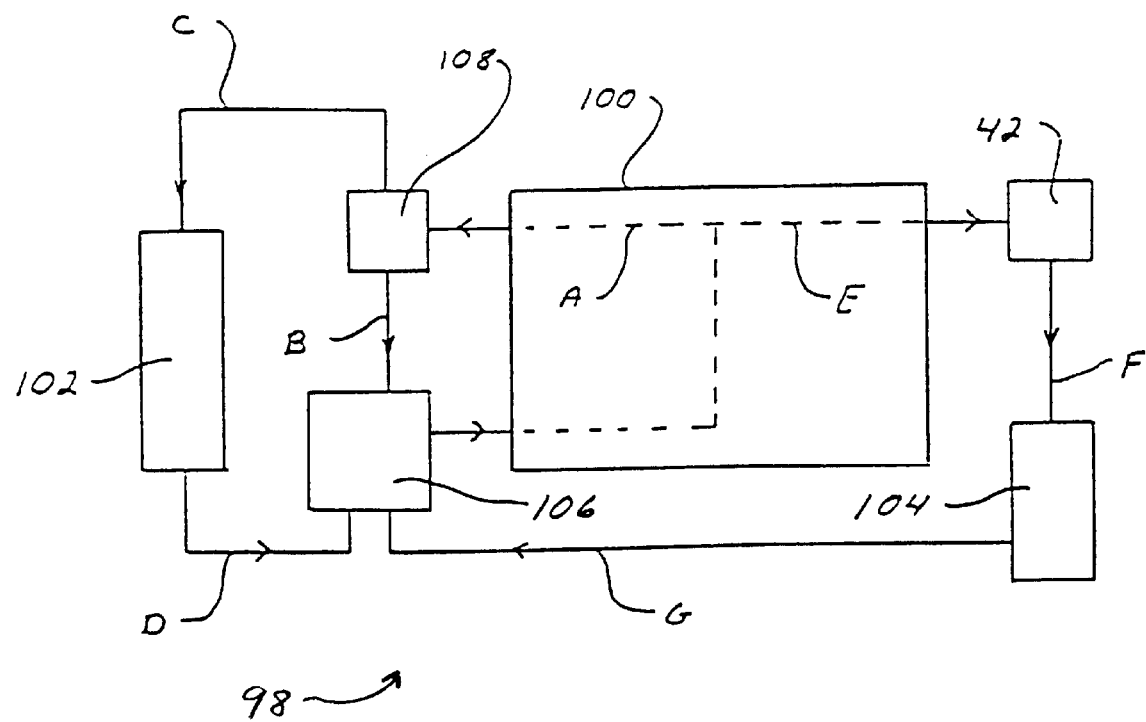
FIG. 6 is a schematic view of an automotive cooling system with an alternator of the present invention.

Referring to FIG. 6, an engine cooling system incorporating an alternator 42 of the present invention is shown generally at 98. The system 98 includes an engine 100, a radiator 102, an alternator 42 and a heater core 104. Coolant is pumped through the system 98 by a water pump 106. Coolant is pumped into the engine 100 from the water pump 106. The coolant picks up heat from the engine and then flows from the engine 100 to a thermostat 108, as shown by line A.

The thermostat 108 is a temperature sensitive valve that keeps the coolant from flowing into the radiator 102 until the coolant reaches a set temperature. This is provided to ensure rapid engine 100 heating to allow the engine 100 to reach the appropriate running temperature prior to the coolant being diverted into the radiator 102 for cooling. If the coolant at the thermostat 108 is cooler than the set temperature, then the coolant is diverted directly back to the water pump 106 as shown by line B. If the coolant is higher than the set temperature, then the thermostat 108 allows hot coolant to flow into the top of the radiator 102, shown by line C, and cooled coolant to flow from the bottom of the radiator 102 to the water pump 106, shown by line D. When the temperature of the coolant passing through the thermostat cools below the set temperature, then the thermostat 108 again diverts the coolant back to the water pump 106.

Heated coolant also flows from the engine to the alternator 42, as shown by line E. The coolant picks up additional heat from the alternator 42 and then flows into the heater core 104 as shown by line F. The heater core 104 is like a small radiator such that a fan blows air through the heater core 104, transferring the heat to the air, thereby cooling the coolant within the heater core 104, and providing heated air to the interior of the vehicle. The coolant then flows from the heater core 104 to the water pump 106, as shown by line G.

While the above description constitutes the preferred embodiment of the present invention, it will be appreciated that the invention is susceptible to modification, variation and change without departing from the proper scope and fair meaning of the accompanying claims.

We claim:

1. An automotive alternator comprising:
   an inner housing;
   an outer housing mounted over said inner housing;
   an internal plate mounted within said outer housing;
   said inner housing, said outer housing, and said internal plate defining a sealed flow chamber;
   said flow chamber including an inlet reservoir and an outlet reservoir located adjacent a first end of said electric machine, and a cross over reservoir located adjacent a second end of said electric machine;
   said inner housing including a plurality of radially extending axial fins, said fins extending radially outward toward an inner surface of said outer housing to define a plurality of axial flow channels;
   a first portion of said plurality of axial flow channels interconnecting said inlet reservoir to said cross over reservoir and a second portion of said plurality of axial flow channels interconnecting said cross over reservoir to said outlet reservoir.

2. The automotive alternator of claim 1 wherein said inner housing includes a sleeve mounted thereon, said plurality of radially extending axial fins extending from said sleeve.

3. The automotive alternator of claim 1 wherein said plurality of radially extending axial fins extend outward to a point in close proximity to said inner surface of said outer housing.

4. The automotive alternator of claim 1 wherein said plurality of radially extending axial fins extend outward and contact said inner surface of said outer housing.

5. The automotive alternator of claim 1 wherein said inlet and said outlet reservoirs are defined by opposing first and second disk shaped portions of said inner housing, said first and second disk shaped portions defining a disk shaped cavity extending diametrically across said electric machine, said inner housing further including a divider extending diametrically across said disk shaped cavity, thereby defining said inlet and outlet reservoirs.

6. The automotive alternator of claim 5 further including an inlet extending from said inlet reservoir and adapted to allow coolant to enter said inlet reservoir, and an outlet extending from said outlet reservoir and adapted to allow coolant to exit said outlet reservoir.

7. The automotive alternator of claim 6 wherein said inlet and said outlet are adapted to connect to a coolant system of an automobile such that liquid engine coolant is circulated through said alternator.

8. The automotive alternator of claim 7 further comprising:
   a shaft rotatably supported within said inner housing by a pair of bearing elements;
   a rotor assembly including first and second pole pieces mounted onto said shaft with an excitation winding mounted between said first and second pole pieces;
   a stator assembly fixedly mounted within said inner housing in functional engagement with said rotor assembly.

9. A coolant system for an internal combustion engine for an automobile comprising:
   an engine having flow passages therein adapted to allow coolant to flow through said engine;
   a radiator adapted to cool the coolant flowing therethrough;
   a heater core adapted to receive heated coolant which has passed through the engine and to provide heated air to a passenger compartment of the automobile;
   an alternator having flow passages therein adapted to allow coolant to flow through said alternator, said alternator being positioned up-stream of said heater core such that heat transferred from said alternator to said coolant is utilized by said heater core to provide heated air to a passenger compartment of the automobile;
   said alternator having and an inner housing, an outer housing mounted over said inner housing, and an internal plate mounted within said outer housing, said inner housing, said outer housing and said internal plate defining a sealed flow chamber;
   said flow chamber including an inlet reservoir and an outlet reservoir located adjacent a first end of said alternator, and a cross over reservoir located adjacent a second end of said alternator;
   said inner housing including a plurality of radially extending axial fins, said fins extending radially outward toward an inner surface of said outer housing to define a plurality of axial flow channels;
   a first portion of said plurality of axial flow channels interconnecting said inlet reservoir to said cross over reservoir and a second portion of said plurality of axial flow channels interconnecting said cross over reservoir to said outlet reservoir.

10. The coolant system of claim 9 wherein said inner housing of said alternator includes a sleeve mounted thereon, said plurality of radially extending axial fins extending from said sleeve.

11. The coolant system of claim 9 wherein said plurality of radially extending axial fins extend outward to a point in close proximity to said inner surface of said outer housing.

12. The coolant system of claim 9 wherein said plurality of radially extending axial fins extend outward and contact said inner surface of said outer housing.

13. The coolant system of claim 9 wherein said inlet and said outlet reservoirs are defined by opposing first and second disk shaped portions of said inner housing, said first and second disk shaped portions defining a disk shaped cavity extending diametrically across said electric machine, said inner housing further including a divider extending diametrically across said disk shaped cavity, thereby defining said inlet and outlet reservoirs.

14. The coolant system of claim 13 wherein said electric machine further includes an inlet extending from said inlet reservoir and adapted to allow coolant to enter said inlet reservoir, and an outlet extending from said outlet reservoir and adapted to allow coolant to exit said outlet reservoir.

15. The coolant system of claim 14 wherein said electric machine further includes:
- a shaft rotatably supported within said inner housing by a pair of bearing elements;
- a rotor assembly including first and second pole pieces mounted onto said shaft with an excitation winding mounted between said first and second pole pieces;
- a stator assembly fixedly mounted within said inner housing in functional engagement with said rotor assembly.

* * * * *

UNITED STATES PATENT AND TRADEMARK OFFICE
CERTIFICATE OF CORRECTION

PATENT NO. : 6,617,715 B1
DATED : September 9, 2003
INVENTOR(S) : Richard K. Harris et al.

It is certified that error appears in the above-identified patent and that said Letters Patent is hereby corrected as shown below:

Title page,
Item [56], References Cited, U.S. PATENT DOCUMENTS, delete "Dolenc" and substitute -- Jenne -- in its place.

Column 9,
Line 17, after "having" delete "and".

Signed and Sealed this

Eighteenth Day of May, 2004

JON W. DUDAS
*Acting Director of the United States Patent and Trademark Office*